GATE CONTROL AMPLIFIER

GATED AMPLIFIER

INVENTOR
Robert Reddington Walsh
BY Birch and Birch
ATTORNEYS

INVENTOR
Robert Reddington Walsh

BY Birch and Birch
ATTORNEYS

INVENTOR
Robert Reddington Walsh
BY Birch and Birch
ATTORNEYS

INVENTOR
Robert Reddington Walsh
BY Birch and Birch
ATTORNEYS

United States Patent Office 3,426,183

Patented Feb. 4, 1969

3,426,183
MULTI-CHANNEL DIGITALIZED PROCESS PARAMETER MONITORING AND SCANNING MEANS WITH MULTIPLE LIMIT PRESET

Robert R. Walsh, Wilmington, Del., assignor to All American Engineering Company, Wilmington, Del., a corporation of Delaware Filed Oct. 8, 1965, Ser. No. 494,107
U.S. Cl. 235—92 10 Claims
Int. Cl. G06g 7/06

ABSTRACT OF THE DISCLOSURE

This invention relates to a multiple channel parameter monitoring system. A single presettable electronic counter scans the parameter channels on a time shared basis. The counter is constructed so that presetting is independently variable for each parameter channel. A plurality of logic gates operates in response to the counter output to switch power among the various parameter channels as each preset count is achieved.

This invention relates to multi-channel process parameter monitoring means in which counter circuits having one or more limit presets for each parameter to be monitored are effectively provided by means of novel preset selector and gating means.

In many industrial processes, there is a wide variety of data representative of the condition of process parameters which can be reduced to a countable digital type signal and an electronic counter can then be utilized to provide a measure of the value of such a process parameter. For example, such process parameters as speeds, time intervals, temperatures, voltages, signal frequencies and the like can be reduced to a digital form which can be readily monitored by electronic counting circuitry to provide a usable readout of the condition of the said parameters.

The use of such counter circuitry in automatic control arts and/or off-limit alarm means is known in the art wherein one or two preset circuits are provided to effect an electrical output signal in response to the achievement of or exceeding of preset limit constraints set up in the said preset circuits by the system parameter being monitored.

Heretofore, such systems have been so complex and costly as to preclude the use thereof in all but extremely high volume processes.

The use of automatic scanning equipment to make such costly and complex circuitry available to a number of data input channels and system parameters monitored thereby has been utilized in an effort to divide the inherently high cost of such instrumentation and equipment among several data monitoring channels on a time sharing basis. However, in the case of such preset counters time-shared by multiple data monitoring channels, such an operation requires that the preset limits of all of the system parameters being monitored be identical or in the alternative, that additional transfer networks be introduced to normalize all counter inputs to the same preset limits, thus markedly increasing the cost of instrumentation.

The preset circuitry must be substantially integrated with the counter circuitry because of the critical nature of the waveforms to be received from the counter circuitry, the said waveforms being of the short rise-time, high-speed pulse type.

Such wave forms are unstable and ineffective in multiple data channel scanning circuitry of the prior art because of the high shunt capacities inherent in multiple preset circuitry. Thus, since these waveforms must be preserved to insure proper functioning of the counter circuits, the introduction of multiple preset networks to handle a plurality of disparate preset limits from multiple data channels has heretofore been unsuccessful, or if successful electronically, unsuccessful economically.

It is, therefore, an object of this invention to provide a new and novel multiple data channel scanning and system parameter monitoring system utilizing a single electronic counter circuit on a time shared basis.

It is another object of this invention to provide a new and novel multiple data channel scanning and system parameter monitoring system utilizing a single electronic counter circuit on a time shared basis and including new and novel multiple preset circuitry for said counter.

Another object of this invention is to provide a new and novel preset selector circuit means for electronic counters wherein said selector means are utilized as power switching means and do not operate on signal waveforms of the said electronic counters associated therewith.

Still another object of this invention is to provide, in a multiple data channel scanning system utilizing a single electronic counter on a time shared basis, a counter limit preset network selectively and independently variable for each data channel to establish data operating limits, said preset network being electrically isolated from said data channels and including a logic network responsive to the output of said counter, to selectively switch operating power through said preset network in response to the achievement of or the exceeding of said preset limits by the data in a channel being scanned.

Still another object of this invention is to provide a multiple data channel scanning system in which the inherent shunt capacity of the system acts only on the power supply as a filter capacitance and has substantially no adverse effect on the input signals transmitted by the counter circuitry.

Yet another object of this invention is to provide a preset electronic counter system which can be time shared by a multiplicity of input data channels by the use of a separate preset selector means for each such data channel.

These and other objects of this invention will become more fully apparent with reference to the following specification and drawings which relate to several preferred embodiments of the invention.

*Gated circuits*

Figure 1:
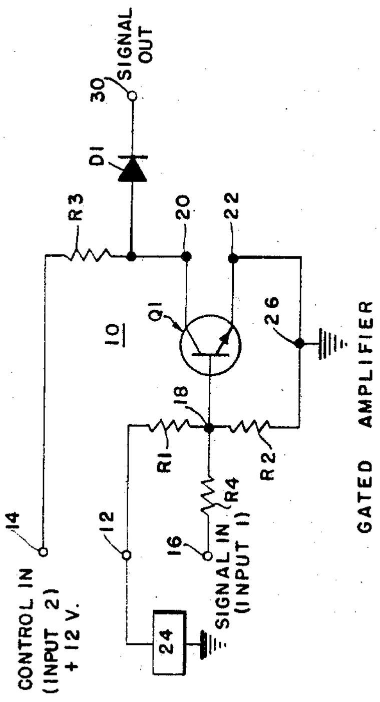
FIGURE 1 is a circuit diagram of a gated amplifier circuit of the present invention.

Referring in detail to the drawings and more particularly to FIGURE 1, the gated amplifier circuit 10 of the present invention is shown as including a bias terminal 12, a control input terminal 14, and a signal input terminal 16; and an N-P-N transistor Q1 having base, collector and emitter terminals 18, 20 and 22, respectively.

The bias terminal 12 is maintained at a D.C. voltage such as for example, +12 volts, by means of a suitable power source 24, and is connected, through a voltage divider comprised of first and second series resistances R1 and R2, respectively, having a common node therebetween comprising the base 18 of the transistor Q1, to the common or ground connection 26 of the gated amplifier 10.

The control input terminal 14 is connected through a third resistance R3 to the collector terminal 20 of the transistor Q1, the said collector terminal 20 being connected through the anode-cathode path of an isolating diode D1 to the signal output terminal 30 of the gated amplifier 10.

The signal input terminal 16 is connected through a fourth coupling resistance means R4 to the base terminal 18 of the transistor Q1; and the emitter terminal 22 of the transistor Q1 is connected to the ground terminal 26 to complete the gated amplifier circuit 10. This particular connection of the emitter terminal 22 of the transistor Q1 is often referred to in the art as a common emitter configuration.

Figure 2:
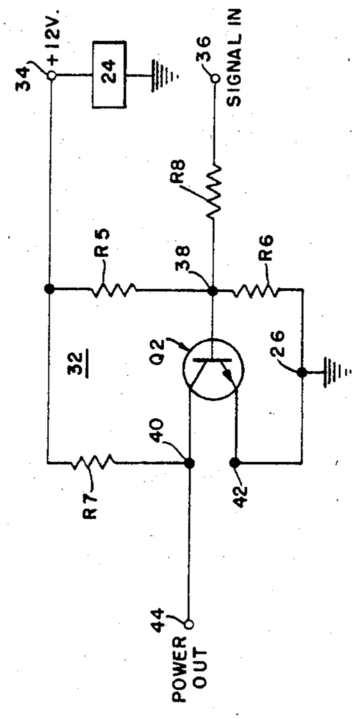
FIGURE 2 is a circuit diagram of a gate control amplifier circuit of the present invention.

Referring now to FIGURE 2, the gate control amplifier 32 of the present invention is shown as including a second bias terminal 34 and a second signal input terminal 36, the said second bias terminal 34 being adapted to be maintained at a D.C. voltage, such as for example, +12 volts, provided by a power supply 24, as in the gated amplifier 10.

The gate control amplifier 32 further includes a ground or common terminal 26 and a second transistor Q2 having base, collector and emitter terminals 38, 40 and 42, respectively.

The second bias terminal 34 is connected, through a voltage divider comprised of fifth and sixth series resistances R5 and R7, respectively, having the base terminal 38 of the second transistor Q2 as a common node therebetween, to the ground terminal 26; and through a seventh resistance R7 to the collector terminal 40 of the transistor Q2, the said collector terminal 40 being directly connected to and comprising the power output terminal 44 of the gate control amplifier 32.

The second signal input terminal 36 is connected through an eighth coupling resistance R8 to the base terminal 38 of the second transistor Q2; and the emitter terminal 42 of the second transistor Q2 is connected directly to the ground terminal 26, effecting a common emitter configuration, to complete the gate control amplifier circuit 32.

Figure 3:
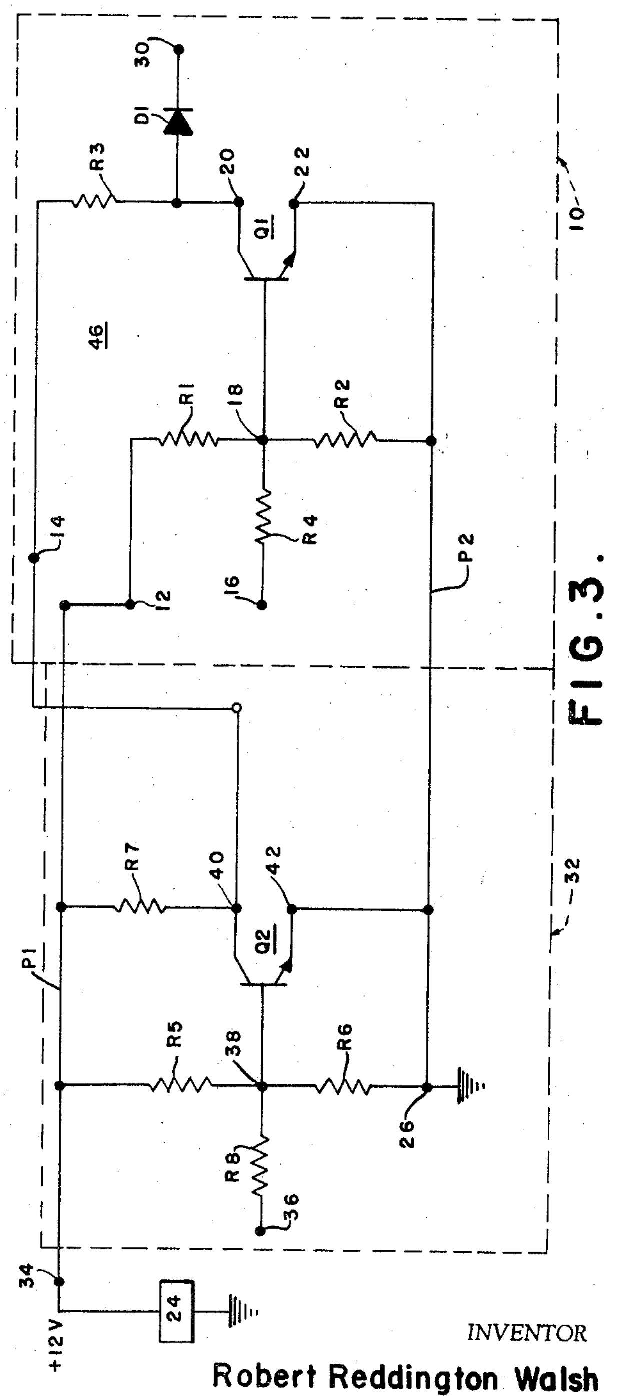
FIGURE 3 is a circuit diagram of a third gated amplifier circuit comprising a combination of the circuits of FIGURES 1 and 2.

Referring next to FIGURE 3, the gate control amplifier 32 is shown to be connected at its power output terminal 44 to the control input terminal 14 of the gated amplifier 10, the first and second bias terminals 12 and 34 being commonly connected to the power source 24 by a positive power lead P1 and the ground connection 26 being common to both said amplifiers by means of a common power lead P2. Thus, the first and second signal input terminals 16 and 36 form the inputs of a composite AND gate 46, having the output terminal 30 of the gated amplifier 10 as its output terminal.

*Operation—Gated amplifier*

Referring back to FIGURE 1, and assuming energization of the power source 24, the base 18 of the first transistor Q1 will be placed at a bias voltage determined by the relative magnitudes of the first and second resistances R1 and R2 in response to the flow of current from the bias terminal 12 to the ground terminal 26.

The operating function of the gated amplifier 10 is an AND function, requiring coincident inputs at the control and signal input terminals 14 and 16, respectively.

For example, assuming resistance values and transistor characteristics for a 12 volt D.C. bias at bias terminal 12 and control input terminal 14, the transistor Q1 will be biased into its fully conductive state in the absence of an input signal at the signal input terminal 16, placing the collector 20 and hence the output terminal 30 at ground potential, thereby representing a "0" (zero) output state. Thus, the bias at the control input terminal 14 is actually the operating power for the transistor Q1 and is a steady state D.C. signal if it is applied.

Now, should a signal occur at the signal input terminal 16, the voltage change imparted to the base terminal 18 will cause the transistor Q1 to be rendered non-conductive and the collector terminal 14 (+12 volts), constraining the output terminal 30 to assume the same voltage which comprises a "1" (unit) output state of the gated amplifier 10.

Finally, should no source of bias be applied to the control input terminal 14, any signal condition whatsoever at the signal input terminal 16 will result in a "0" (zero) output state since there is no operating power applied to the transistor Q1 of the gated amplifier 10.

Thus, the unit output state will occur only upon the advent of simultaneously applied signal functions at the control and signal input terminals 14 and 16, respectively, and the accepted criterion of an AND function has been satisfied.

*Operation—Gate control amplifier*

Referring next to FIGURE 2, and assuming energization of the source 24 and the presence of a (+12 volt) bias voltage at the second bias terminal 34, the gate control amplifier 32 will produce a unit state output at the power output terminal 44 in response to a unit input signal at the second signal input terminal 36 and a zero state output in response to a zero state input signal. Thus, the gate control amplifier 32 functions purely as a logic switching circuit.

The transistor Q2 and resistance values in the gate control amplifier 32 are selected such that the transistor Q2 is rendered conductive in the absence of an input signal at the second signal input terminal 36 by the presence of the +12 volt bias at the second bias terminal 34. Thus, the collector 40 and the power output terminal 44 will be clamped at ground potential.

Should a unit state input signal be applied to the second signal input terminal 36, the resultant voltage change effected at the base terminal 38 of the transistor Q2 through the coupling resistance R8 will render the said transistor Q2 nonconductive and clamp the collector terminal 40 and the power output terminal 44 at the bias voltage (+12 volts) of the second bias terminal 34 as provided by the power source 24. This constitutes a unit state output signal output in response to a unit state input signal in the gate control amplifier 32.

*Operation—Composite and gate*

Referring now to FIGURE 3, both the first and second transistors Q1 and Q2, respectively, are normally biased into the conductive state by the application of the bias voltage (+12 volts) on the positive lead P1 to the first and second bias terminals 12 and 34, respectively.

Accordingly, if unit state input signals are respectively applied to the first and second signal input terminals 16 and 36 and are applied during a coincident time interval, the AND gate 32 will respond as follows: The second transistor Q2 will be rendered non-conductive and the full bias voltage will be applied through the power output terminal 44 to the control input terminal 14 of the gated amplifier 10; then the first transistor Q1 will respond to the simultaneous application of input signals to the control terminal 14 and the first signal input terminal 16, causing the first transistor Q1 to be rendered non-conductive and thereby constrain the signal output terminal 30 to assume the value of bias voltage (+12 volts) at the control input terminal 14 for the duration of the coincident time interval of the unit state input signals. Thus, a unit state output is effected by the AND gate 46 at the signal output terminal 30 upon the coincident occurrence of unit state input signals at the first and second signal input terminals 16 and 36.

*Single preset-single digit systems*

Figure 4:
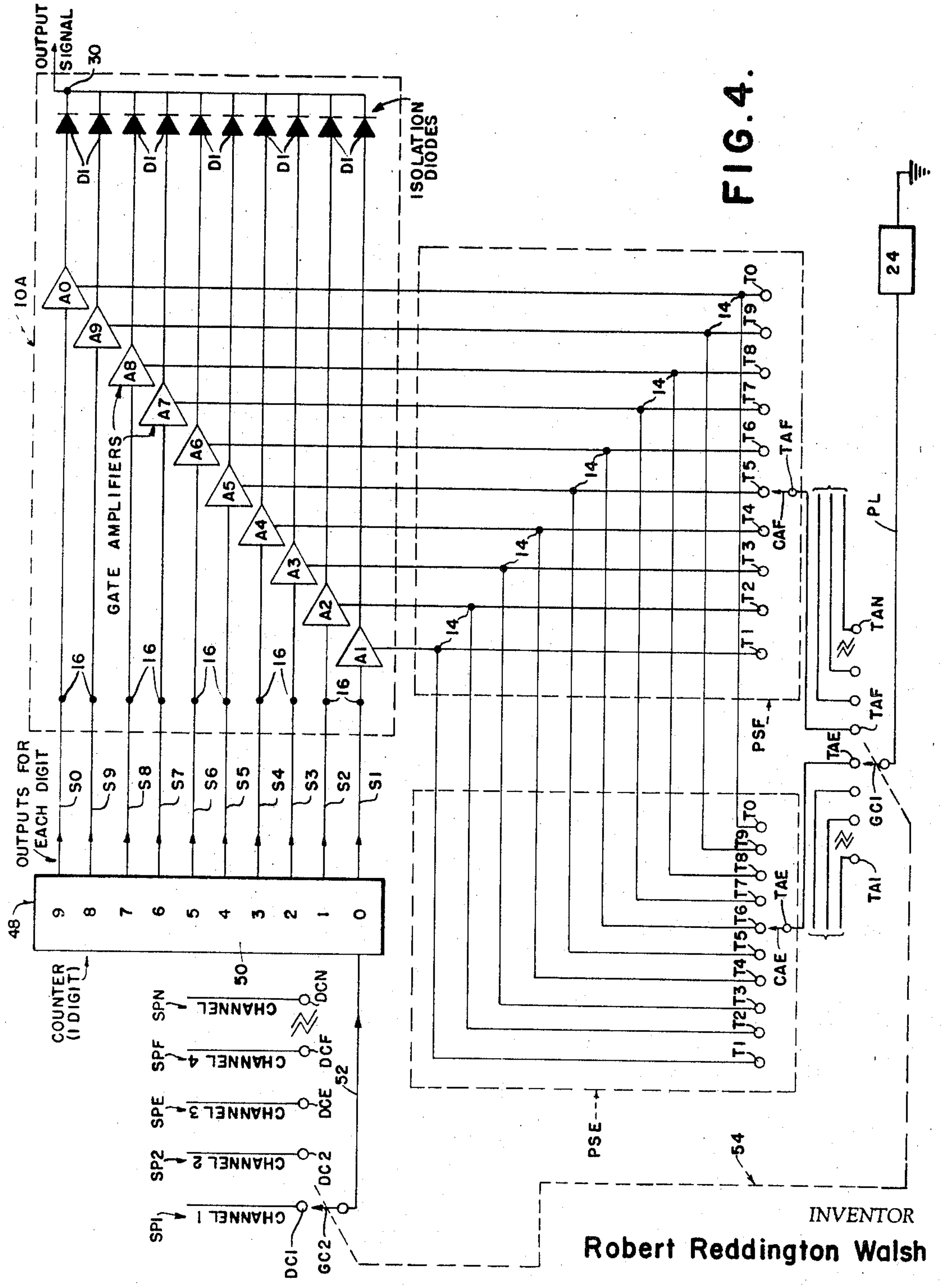
FIGURE 4 is a block diagram of a process parameter monitoring system of the present invention wherein the respective parameters have disparate single digit single respective presets.

Referring now to FIGURE 4, a single preset-single digit monitoring and scanning system of the present invention is shown as including counter means 48 having a single counter decade 50, the said decade 50 including an input lead 52 and ten counter output leads S1, S2 . . . S0, one for each of the units 0, 1, 2 . . . 9, respectively, of the said decade 50.

The counter output leads S1 . . . S0 are respectively connected to a like plurality of signal input terminals 16 of a bank 10A of the aforedescribed gated amplifiers 10, the latter being designated hereinafter as gated amplifiers A1 . . . A0, having their respective signal input terminals 16 connected with the counter output leads S1 . . . S0.

Each of the gated amplifiers A1 . . . A0 is provided with a control input terminal 14 and each further includes the output circuit, previously described for the gated amplifier 10 of FIGURE 1, comprising the anode-cathode path of a diode D1 connected to an output terminal 30. A common output terminal 30 is shown in FIGURE 4, this being made possible by the isolating or blocking action of the diodes D1.

The digital representation of the system parameters SP1 . . . SPN to be monitored is transmitted to the system illustrated by means of respectively associated data channels DC1 . . . DCN.

A plurality of decade preset selector switches PS1 . . . PSN are provided in respective association with the data channels DC1 . . . DCN such that the respective preset limits for the system parameter signals SP1 . . . SPN can be provided. The preset selector switches shown in FIGURE 4 are designated PSE and PSF to indicate that they are adjacent intermediate switches in the sequence PS1 . . . PSN.

Each of the preset selector switches PS1 . . . PSN includes ten switch output terminals T1 . . . T0, connected by respectively associated leads with the control input terminals 14 of the gated amplifiers A1 . . . A0, respectively.

The preset selector switches PS1 . . . PSN are provided, respectively, with switch input terminals TA1 . . . TAN, the said selector switches PSE and PSF having input terminals TAE and TAF, respectively. The switch input terminals TA1 . . . TAN are each provided with a selective connector means CA1 . . . CAN whereby the input terminals TA1 . . . TAN may be selectively connected with one of the ten switch output terminals T1 . . . T0 in their respectively associated preset selector switches PS1 . . . PSN. For example, as shown in FIGURE 4, the input terminal TAE of the preset selector switch PSE is connected via the connector means CAE to the sixth switch output terminal T6 and a similar connection made from the input terminal TAF of the preset selector switch PSF through the connector means CAF to the fifth switch output terminal T5.

A gate power supply lead PL adapted to supply operating power for the gated amplifiers A1 . . . A0 through the control input terminals 14 thereof is provided with a selective connector means GC1 which is so positioned and adapted as to selectively connect the gate power supply lead PL with one of the switch input terminals TA1 . . . TAN.

The counter input lead 52 is provided with a selective connector means GC2 which is so positioned and adapted as to selectively connect the counter input lead 52 with one of the digital information channels DC1 . . . DCN.

The system is completed by a gang stepping mechanism 54, indicated schematically in phantom lines, such as for instance the mechanism of a C.P. Glare model 26 stepping switch, which coordinates the selective connector means GC1 and GC2 such that a sequential stepping may be effected to interconnect the gate power supply lead PL with that one of the input switch terminals TA1 . . . TAN having the corresponding subscript to that one of the digital information channels DC1 . . . DCN connected at the same time to the counter input lead 52. Thus, as will be hereinafter more fully described, the digital information on each of the information channels DC1 . . . DCN and its effect on the counter 48 will be monitored in sequence by a coordinated sequential scanning of the preset selector switches PS1 . . . PSN.

For example, assuming that a digital six (6) count of the counter is a predetermined operating limit for the system parameter SPE being monitored with a representative digital information signal being over its associated information channel DCE representative of the magnitude of the said parameter.

As the connector means GC1 and GC2 are simultaneously stepped to scan the information channels DC1 . . . DCN and preset selector switches PS1 . . . PSN in sequence, at some point in time and for a given time interval the gate power supply lead PL will be connected with the input terminal TAE of the preset selector switch PSE and the input lead 52 of the decade 50 of the counter 48 will be connected with the information channel DCE.

Since the input switch terminal TAE is preset to be connected with the sixth switch output terminal T6, then the sixth gated amplifier A6 has operating power applied to its control input terminal 14 via the gate power supply lead PL, connector means GC1, switch input TAE, switch connector CAE and switch output terminal 16 in the preset selector switch PSE.

Simultaneously, the digital signal representative of the system parameter SPE is being transmitted through information channel DCE, connector means GC2 and counter input lead 52 causing the counter decade to reproduce the digital information by sequential output counting pulses in the leads S1 . . . S0.

Should the count of the digital signal be 6, the line S6 will be energized by an output pulse which will be applied to the signal input terminal 16 of the sixth gated amplifier A6. Thus, the AND function defined with reference to the gated amplifier 10 of FIGURE 1 is satisfied and an output pulse will appear at the output terminal 30, indicating that the system parameter SPE has reached its predetermined operating value the latter being a constraint placed on the system by the respectively associated preset selector switch PSE.

*Single preset-multiple digit systems*

Figure 5:
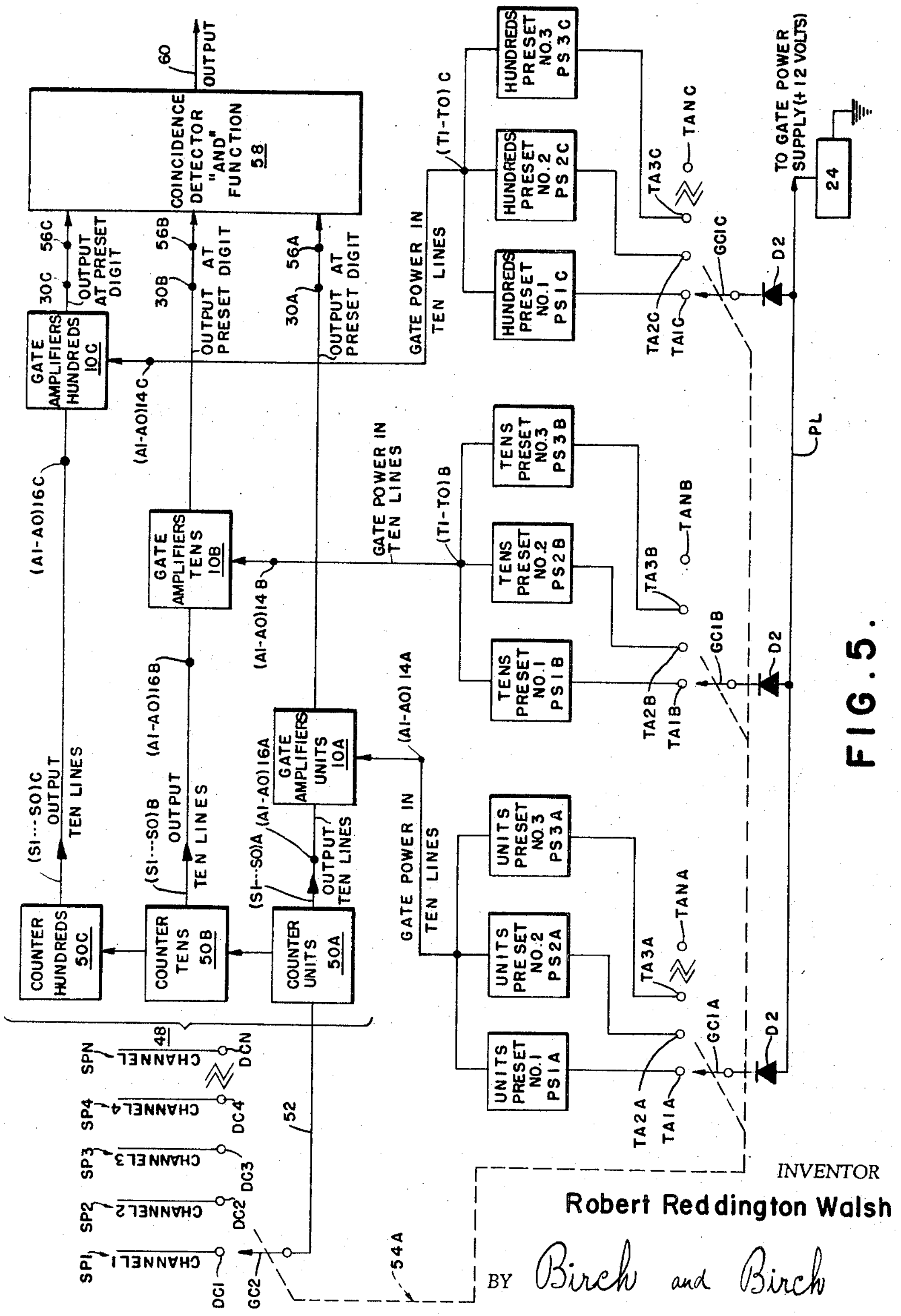
FIGURE 5 is a block diagram of another embodiment of a process parameter monitoring system of the present invention wherein the respective parameters have disparate multiple digit single respective presets.

Referring next to FIGURE 5, a system is disclosed in which a single preset is maintained for each of the system parameters SP1 . . . SPN to be monitored, but means are provided by which the representation of the monitored parameter may be in three-digit magnitudes, i.e. from 0 to 999. Like numerals relate to like elements between FIGURES 1, 2, 3, 4 and 5.

The counter circuit 48 comprises three decades in the specific embodiment shown in FIGURE 5, namely, the units decade 50A, the tens decade 50B and the hundreds decade 50C. As previously described in reference to FIGURE 4, the counter 48 is fed by an input lead 52 coupled via selective coupling means GC2 to the information channels DC1 . . . DCN carrying the digital information signals for the system parameters SP1 . . . SPN, respectively.

Since a three digit system is indicated, three additional selective connector means GC1A, GC1B and GC1C for the units, tens and hundreds digits, respectively, are gang-connected with the selective connector GC2 by means of a gang type scanning drive means 54A. Each of the scanning connector means GC1A . . . GC1C are connected with the gate power supply lead PL through an isolating diode D2, the cathode terminal of the said diode D2 being adjacent the respectively associated connector means GC1A . . . GC1C.

For each digit of the multi-digit limit or preset to be monitored, there are preset selector switch mechanisms PS corresponding to the number of information channels DC. Specifically, in the case of three digits there are preset selector switches P1A . . . PNA for the units, P1B . . . PNB for the tens, and P1C . . . PNC for the hundreds digits from the information channels DC1 . . . DCN, respectively, the said preset selector switches, in the respective groups defined above, having selector input terminals TA1A . . . TANA, TA1B . . . TANB and TA1C . . . TANC.

The units digit preset selector switches PS1A . . . PSNA are shown with a common ganged output cable connection (T1–T0)A, representing all ten output lines of each such preset selector; the tens digit preset selector switches PS1B . . . PSNB are shown with a common ganged output cable connection (T1–T0)B, representing all ten output lines of each such preset selector; and the hundreds digit preset selector switches PS1C . . . PSNC are shown with a common output cable connection (T1–T0)C, representing all ten output lines of each such preset selector.

Decade bank of gated amplifiers 10A, 10B and 10C are provided, respectively, for the output lead groups (S1–S0)A, (S1–S0)B and (S1–S0)C of the counter decades 50A, 50B and 50C, respectively; individual connections in each such decade being made in the identical manner to that of the leads S1 . . . S0 of FIGURE 4, to the groups of signal input terminals (A1–A0)16A, (A1–A0)16B and (A1–A0)16C, respectively.

The preset selector output terminals (T1–T0)A, (T1–T0)B and (T1–T0)C are connected, respectively, with the control input terminals (A1–A0)14A, (A1–A0)14B and (A1–A0)14C of the gated amplifier decades 10A, 10B and 10C.

The gated amplifier decades 10A, 10B and 10C are provided with units, tens and hundreds output terminals 30A, 30B and 30C, respectively, which in turn are respectively connected at signal input terminals 56A, 56B and 56C of a coincidence detector gate 58, the latter having an output terminal 60.

In operation, assuming that the first information channel DC1 and the corresponding system parameter SP1 are being monitored, the gang scanner 54A will constrain the connectors GC1A, GC1B, GC1C and GC2 to engage, respectively, preset selector input terminals TA1A, TA1B, TA1C and channel DC1, thus connecting the said channel DC1 to the counter input lead 52 and supplying gate power to the said preset selector input terminals TA1A, TA1B and TA1C.

If, for example, the preset limit for the system parameter SP1 is 789, the preset selector switches PS1A, PS1B and PS1C are set, respectively, to utilize switch output terminals (T9)A, (T8)B and (T7)C. Thus, should the set value in each digit be reached by the respectively associated counter decades 50A, 50B and 50C, the counter output signal leads (S9)A, (S8)B and (S7)C will carry output signals and thus energize the signal input terminals (A9)16A, (A8)16B and (A7)16C, respectively. There will be gate amplifier operating power continuously applied through the lead PL, isolating diodes D2, connectors GC1A . . . GC1C, input terminals TA1A . . . TA1C and output terminals (T9)A, (T8)B and (T7)C to the control input terminals (A9)14A, (A8)14B and (A7)14C of the gated amplifier banks 10A, 10B and 10C respectively.

Therefore, upon the occurrence of each of the preset limit outputs from the counter 48, the condition of simultaneous inputs to one of the gated amplifiers A1 . . . A0 in one of the gated amplifier banks 10A . . . 10C will be satisfied and an output signal will appear at a corresponding one of the outputs 30A . . . 30C.

Once all of the outpus 30A . . . 30C have been energized, the entire multiple digit (in this case three (3) digit) preset limit condition of the monitored parameter SP1 will have been satisfied and the resulting simultaneous presence of input signals at all of the input terminals 56A . . . 56C of the coincidence gate 58 will result in an output signal at the final system output terminal 60.

Thus, when the present limit constraint is satisfied, the system will produce a signal for alarm and/or control purposes.

The gang scanner 54A will be cycled to sequentially scan all of the information channels DC1 . . . DCN and will, therefore, systematically monitor all of the system parameters SP1 . . . SPN by the simple expedient of switching gate operating power from the power lead PL, through the isolating diodes D2 and counter means GC1A . . . GC1C into the respectively related preset selector switch means PS1A . . . PSNA, PS1B . . . PSNB and PS1C . . . PSNC, each of which is preset to impose a limit constraint on a particular digit of the multiple digit limit constraint on the respective system parameters SP1 . . . SPN.

*Multiple preset-multiple digit systems*

Figure 6:
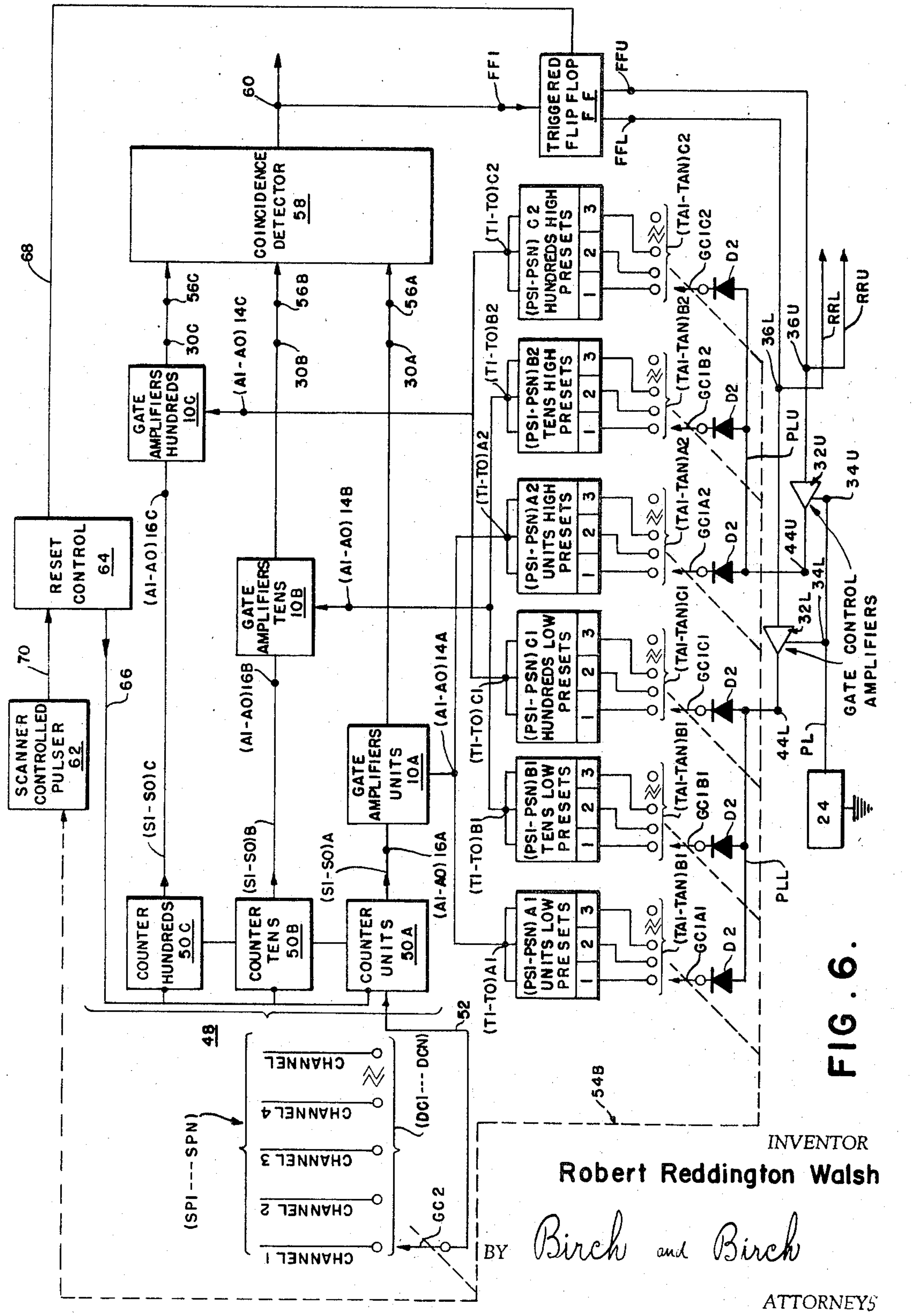
FIGURE 6 is a block diagram of still another embodiment of a process parameter monitoring system wherein the respective parameters have multiple digit multiple respective presets.

Referring now to FIGURE 6, a multiple preset-multiple digit scanning and monitoring system will be described and more specifically, the system shown and described is a dual preset three digit system of the type adapted to place upper and lower limit constraints on a system parameter for the purpose of defining the proportional band or normal operating range thereof. Like numerals to FIGURE 5 indicate like elements in FIGURE 6 and the counter 48, counter decades 50A . . . 50C, gated amplifier banks 10A . . . 10C, coincidence gate 58 and all of the respective interconnections of the foregoing elements are identical to these of FIGURES 1–5.

The preset selector switches of the system of FIGURE 6 are arranged in two banks; the lower limit selector bank comprising preset selector switches (PS1–PSN)A1, (PS1–PSN)B1 and (PS1–PSN)C1; and the upper limit selector bank comprising preset selector switches (PS1–PSN)A2, (PS1–PSN)B2 and (PS1–PSN)C2. As in FIGURE 6, the suffixes A, B and C designate units, tens and hundreds, respectively. The suffixes 1 and 2 designate the lower and upper limit banks, respectively.

The gang scanning means 54B is connected to synchronize both the lower and upper selector banks by means of lower selector bank connectors GC1A1, GC1B1 and GC1C1 and upper selector bank connectors GC1A2, GC1B2 and GC1C2, selectively connectable, respectively, to lower bank switch input terminals (TA1–TAN)A1, (TA1–TAN)B1 and (TA1–TAN)C1 and upper bank switch input terminals (TA1–TAN)A2, (TA1–TAN)B2 and (TA1–TAN)C2.

Specifically illustrated are the selector means PS1A1 . . . PS3A1, PS1B1 . . . PS3B1, PS1C1 . . . PS3C1, PS1A2 . . . PS3A2, PS1B2 . . . PS3B2 and PS1C2 . . . PS3C2 corresponding to the first three consecutive system parameters SP1 . . . SP3 and the information channels DC1 . . . DC3, respectively. These are indicated by the rectangular block labelled 1, 2 and 3 in each of the respectively associated preset selector switch units illustrated in the lower and upper selector banks.

Lower and upper limit gate control amplifiers 32L and 32U are provided for the lower and upper selector banks, respectively. The lower limit gate control amplifier 32L is connected at its power output terminal 44L to a lower bank gate power lead PLL common to all of the lower bank preset selector switches (PS1–PSN)A1 . . . 1PS1–PSN)C1 at the anodes of the respective isolating diodes D2 thereof. The upper limit gate control amplifier 32U is connected at its power output terminal 44U to an upper bank gate power lead PLU common to all of the upper bank preset selector switches (PS1–PSN)A2 . . . (PS1–PSN)C2 at the anodes of the respective isolating diodes D2 thereof.

The (second) bias terminals 34L and 34U of the upper and lower bank gate control amplifiers 32L and 32U, respectively, are connected to the common gate power supply lead PL to provide operating power for the said gate control amplifiers and ultimately, as will be hereinafter more fully described, to supply operating power to the selectively energized gated amplifiers of the gated amplifier banks 10A . . . 10C.

The system is further provided with a resettable flip-flop circuit FF, such as an Engineered Electronics T633, having trigger signal input terminal FF1, a reset signal input terminal FFR and lower and upper state signal output terminals FF1 and FFU, respectively. The trigger input terminal FF1 of the flip-flop FF is connected directly to the final output terminal 60 of the coincidence gate 58; the lower state output terminal FFL is connected directly to the lower bank control amplifier 32L at the (second) signal input terminal 36L thereof; and the upper state output terminal FFU is connected directly to the upper bank control amplifier 32U at the (second) signal input terminal 36U thereof.

The lower and upper state output signals may be transmitted to other remote sensing or control circuits from the respective lower and upper output state terminals FFL and FFU by means of lower and upper state signal transmission lines RRL and RRU, respectively.

The counter 48 and the flip-flop FF are necessarily reset at the conclusion of the monitoring cycle for each of the system parameters SP1 . . . SPN such as, for example, by a gang scanner controlled pulser 62 which energize a reset control circuit 64 each time the gang scanner 54B causes the connector means GC1A1 . . . GC1C1, GC1A2 . . . GC1C2 and GC1 to step to the next terminal in the scanning sequence of the system.

The reset control circuit has a counter reset output lead 66 and a flip-flop reset output lead 68, the former being connected in common to the counter decades 50A . . . 50C and the latter being connected with the reset terminal FFR of the flip-flop FF. The output of the gang scanner controlled pulser 62 is connected with the input of the reset control means 64 by means of a coupling circuit means 70 to complete the system.

In operation, assuming the system parameter SP1 is to be monitored, the ganged scanner means 54B will constrain the several connector means of the system as follows:

In the lower bank:

(1) Connector GC1A1 will contact selector switch input terminal (TA1)A1;

(2) Connector GC1B1 will contact selector switch input terminal (TA1)B1;

(3) Connector GC1C1 will contact selector switch input terminal (TA1)C1;

In the upper bank:

(4) Connector GC1A2 will contact selector switch input terminal (TA1)A2;

(5) Connector GC1B2 will contact selector switch input terminal (TA1)B2;

(6) Connector GC1C2 will contact selector switch input terminal (TA1)C2: and

On the counter 48:

(7) Connector GC2 will interconnect the first information channel DC1 with the counter input lead 52.

As a result, preset limits will exist, depending upon the individually selected presets, as follows:

In the lower bank:

(1) Unit preset in selector switch (PS1)A1;

(2) Tens preset in selector switch (PS1)B1;

(3) Hundreds preset in selector switch (PS1)C1;

In the upper bank:

(4) Units preset in selector switch (PS1)A2;

(5) Tens preset in selector switch (PS1)B2; and (6) Hundreds preset in selector switch (PS1)C2.

Immediately prior to the occurrence of the scanning cycle of the first system parameter SP1, it will be assumed that a reset pulse has been generated in each of the reset control output leads 66 and 68 and therefore, the counter 48 has been reset to zero and the flip-flop FF has been reset to provide a lower limit state output signal at the corresponding terminal FFL thereof, this latter condition being the initial or base state of the flip-flop FF in the system.

Assume now, for example, that a lower limit constraint of 123 and an upper limit constraint of 456 are placed on the system parameter SP1, thereby defining the operating range thereof over a proportional band of relative magnitude 333.

Since the lower limit state is reached first by the counter 48 and the flip-flop FF is reset to provide a corresponding lower limit state output signal, the previously defined operation of the gate control amplifier 32 of FIGURE 2 coupled with the fact of input signals at the (second) bias terminal 34L and (second) signal input terminal 36L of the lower bank gate control amplifier 32L clearly results in the application of amplifier operating power from the source 24 through common power lead PL, lower bank control amplifier 32L and the power output terminal 44L of the latter to the lower bank power lead PLL.

As already described herein for the system of FIGURE 5, the lower limit constraint 123 causes a response to the counts in the counter decades 50A . . . 50C such that, ultimately, the amplifiers (A3)10A, (A2)10B and (A1)10C will be gated on in response to the achievement of the lower limit constraint of the first system parameter SP1 on a digit-by-digit basis. Once the entire three digit lower limit of 123 is satisfied, there will be simultaneous output signals at the amplifier outputs 30A . . . 30C and the coincidence gate inputs 56A . . . 56C causing the coincidence gate 58 to generate an output signal at the final output terminal 60 indicative of the achievement of the lower limit constraint by the first sysem parameter SP1.

The output signal at the terminal 60 is applied to the trigger input FF1 of the flip-flop FF, causing the latter, by means well-known in the art, to change its state, resulting in the deletion of the lower limit state output signal at the corresponding output terminal FFL and the generation of an upper limit state output signal at the upper limit state output terminal FFU. Thus, in response to the satisfaction of the lower limit constraint by the first system parameter SP1, the lower selector bank gate control amplifier 32L will be de-energized and the upper selector bank gate control amplifier 32U will be energized, the latter being effected by the simultaneous application of signals to the (second) bias terminal 34U and (second) signal input terminal 36U thereof.

Therefore, once the lower limit has been exceeded, gate operating power is removed from the lower selector bank and applied to the upper selector bank from the source 24 through the common lead PL (second) bias terminal 34U, upper bank control amplifier 32U, the power output terminal 44U of the latter and the common upper bank power lead PLU. Now, the preset selector switches (PS1)A2, (PS1)B2 and (PS1)C2 through the switch output terminals T6, T5 and T4 thereof, respectively, and the corresponding control input terminals (A6)14A, (A5)14B and (A4)14C will supply gate operating power to the gated amplifiers (A6), A5 and A4 of the gated amplifier banks 10A, 10B and 10C, respectively, such that upon the achievement of the upper limit constraint by the system parameter SP1, digit-by-digit as hereinbefore described, the coincidence gate 58 will once more be energized to effect an output signal at the final output terminal 60. It will be noted that flip-flop FF will be in its initial or base state whenever the cumulative count on the counter is outside the limits defined by the lower and upper limit preset selectors. And conversely that it will be in its upper state whenever the said cumulative count is within the said lower and upper preset limits. Thus, suitable alarm and/or control circuitry may be triggered to indicate and/or control the existence of an off-normal condition of the first system parameter SP1. The identical cycle is repeated for each of the system parameters SP1 . . . SPN as the gang scanner steps the connectors on the information channels DC1 . . . DCN, the lower limit bank preset selectors (PS1 . . . PSN)A1 . . . (PS1 . . . PSN) A2 . . . (PS1 . . . PSN)C2.

The operation of the upper and lower gate control amplifiers 32L and 32U, respectively, in cooperation with the individual gated amplifiers A1 . . . A0 of the gated amplifier banks 10A . . . 10C is identical with the composite "AND" circuit 46 previously described herein with reference to FIGURE 3, the difference being in the preset selection of multiple connecting paths between the gate control amplifiers 32L and 32U and the gated amplifiers A1 . . . A0 of the amplifier banks 10A . . . 10C.

The extreme versatility and stability of the systems of the present invention now become readily apparent in view of the foregoing specification and drawings.

Large pluralities of digital information channels may be monitored in sequence with the only loading on any given channel being effected by the input circuit of the counter being used. All of the gating signals for the gated amplifier banks, preset selectors and, when utilized, gate control amplifiers in a composite AND configuration, are provided by the direct current power source for the system. Thus, no distortion of critical information wave shapes which operate the counter will be effected, regardless of the number of information channels and system parameters to be monitored. The information signal inputs are therefore completely isolated from the indicating and/or control system outputs and no selective or switching functions are performed on the said information signal paths.

The present invention thus satisfies a long felt need in the art by providing a system wherein a preset electronic counter can be time shared over a large number of data input channels having either single or multiple like or disparate preset limits of single or multiple digits by the simple expedient of adding to the system a separate set of preset selector means for each data input channel to be scanned and monitored by the counter. Further, new and novel gating circuitry has been provided whereby the simple system enlarging expedients described above can be readily effected.

It is to be understood that the various embodiments of the present invention shown and described herein are for the purpose of example and are not intended to limit the scope of the appended claims.

What is claimed is:

1. Monitoring means selectively switching operating power to a predetermined circuit node in response to a predetermined input signal comprising a data source of countable input signals; a counter means having an input in circuit with said data source adapted to receive said input signals, said counter means producing an output signal for each incremental count thereof and including an output network comprising output signal transmitting means for each said incremental count of said counter means; gated amplifier means including signal input means in circuit with each said output signal transmitting means adapted to receive respective ones of said counter output signals, and including control signal input means for each said signal input means; a source of operating power for said gated amplifier means; and preset limit selector means including a common input circuit supplied by said source of operating power, power output circuit means in circuit with each said control signal input means of said gated amplifier means, and means selectively interconnecting said common input circuit means with certain of said power output circuit means; said gated amplifier means having a common control signal output circuit node and acting to interconnect same with said power source upon the occurrence of simultaneous input signals at said signal and control signal input means thereof, said occurrence being determined by the incremental count of said counter means and the selected one of said power output circuit means in said preset selector means.

2. The invention defined in claim 1, wherein said counter means includes counter module means of a predetermined number of counting increments; wherein said preset limit selector means includes a like predetermined number of power output circuit means; wherein at least a like number of said preset limit selector means to the number of said counter module means are provided for each countable input signal from said data source; and wherein said monitoring means further includes scanning means selectively interconnecting a particular countable input signal and its respectively associated preset limit selector means in circuit with said counter means and said source of operating power, respectively.

3. The invention defined in claim 1, wherein said counter means includes counter module means of a predetermined number of counting increments; wherein said preset limit selector means includes a like predetermined number of power output circuit means; wherein twice the number of said preset limit selector means as the number of counter module means are provided for each countable input signal from said data source; wherein said preset limit selector means are grouped in lower and upper limit control banks, each said control bank having a respectively common circuit connection with said power source comprising lower and upper bank gated amplifier means each having second signal input circuit means, second bias circuit means interconnected with said source and an intermediate power output node commonly connected to the said common terminal means of the respectively associated preset limit selector means in said lower and upper control banks, and being responsive to the application of an intermediate control signal to said second signal input circuit means to apply operating power to the said intermediate power output node and the respectively associated one of the said control banks, and intermediate control signal generating means responsive to the occurrence of the initiation of a count of an input signal applying a first intermediate control signal to said second input signal circuit of said lower bank gated amplifier and responsive to a subsequent switching of operating power to said output circuit node nullifying said first intermediate control signal and applying a second intermediate control signal to said second input signal circuit of said upper bank gated amplifier.

4. Scanning and monitoring means for a plurality of data sources, said data sources providing a respective plurality of countable input signals transmitted respectively, over a plurality of signal transmission channels, comprising: counter means including at least one counter module providing a predetermined number of incremental counts and generating a like number of counter output signals upon the respective occurrences of said incremental counts, and input signal input circuit means; scanning means effecting interconnection of each transmission channel with said input circuit means of said counter means for a predetermined time interval; and monitoring means providing an output signal upon the occurrence of a predetermined count of said counter means individually selected for each of said number of countable input signals, said monitoring means comprising for each such counter module: a like number of counter output signal transmission means; a source of operating power; an output node; a like number of transmission means; a like number of logical AND switching means respectively in circuit with said signal transmission means and corresponding ones of said power transmission means constraining said power transmission means to apply operating power to said output node as an output signal in response to the simultaneous occurrence of a counter output signal and operating power, respectively, on said corresponding ones of said signal and power transmission means; and a like number of selector means respectively interconnected with said source of operating power by said scanner means in synchronism with the connection of respective ones of said data transmission channels with said counter means; said selector means selectively connecting said power transmission means in circuit with said source of operating power and thereby effecting the predetermination of the said predetermined count of said counter means.

5. The invention defined in claim 4, wherein said monitoring means further includes unidirectional conductive means in circuit between each of said logical AND switching means and said output node.

6. Scanning and monitoring means for a plurality of data sources, said data sources providing a respective plurality of countable input signals transmitted, respectively, over a plurality of signal transmission channels, comprising: Counter means including at least one counter module providing a predetermined number of incremental counts and generating a like number of counter output signals upon the respective occurrences of said incremental counts, and input signal input circuit means; scanning means effecting interconnection of each transmission channel with said input circuit means of said counter means for a predetermined time interval; and monitoring means providing an output signal upon the occurrence of a predetermined count of said counter means individually selected for each of said number of countable input signals, said monitoring means comprising for each such counter module: a like predetermined number of gated amplifier means each having first and second input circuits and an output node, said first input circuits being connected to each receive a respective one of said counter output signals; a power source; a like number of selector means including, respectively, a like number of common power input terminals adapted to be energized by said power source, a plurality of power output terminals for each of said common input terminals connected one in each of said second input circuits, and variable connector means selectively connecting each said common input terminal in circuit with one of the said respectively associated plurality of power output terminals, thereby designating the said gated amplifier and respectively associated count of said counter to which said monitoring means will respond by selectively controlling the flow of operating power to a designated second input circuit of said gated amplifier means; and switch means driven by said scanner means selectively interconnecting a predetermined one of said common power input terminals of said selector means with said power source in synchronism with the interconnection of a predetermined respective one of said data transmission channels with said counter input circuit; each said gated amplifier means effecting an output signal at the said output node thereof in response to the coincident occurrence of a counter output signal and operating power, respectively, at said first and second input circuits thereof.

7. The invention defined in claim 6, wherein each said gated amplifier means further includes unidirectional conductive means interconnecting said amplifier means and said output node; and wherein said output node is common to all said gated amplifier means.

8. Scanning and monitoring means for a plurality of data sources, said data sources providing a respective plurality of countable input signals transmitted, respectively, over a plurality of signal transmission channels, comprising: counter means including at least one counter module providing a predetermined number of incremental counts and generating a like number of counter output signals upon the respective occurrences of said incremental counts, and input signal input circuit means; scanning means effecting interconnection of each transmission channel with said input circuit means of said counter means for a predetermined time interval; and monitoring means providing an output signal upon the respective occurrences of predetermined counts of said counter means, said counts being individually selected for each of said number of countable input signals, said monitoring means comprising for each such counter module: a like plurality of counter output signal transmission means; a source of operating power; an output node; a like plurality of power transmission means; a like plurality of logical AND switching means respectively in circuit with said signal transmission means and corresponding ones of said power transmission means constraining said power transmission means to apply operating power to said output node as an output signal in response to the simultaneous occurrence of a counter output signal and operating power, respectively, on said corresponding ones of said signal and power transmission means; selector means for each said predetermined count of said counter means for each of said data transmission channels interconnected with said scanner means to be selectively included in said monitoring means in synchronism with the interconnection of a respective one of said data transmission channels with said count input circuit selectively providing a connecting circuit between said power transmission means and said source of operating power; power switching means for each said predetermined count of said counter means including a power input circuit connected with said source of operating power, a control signal input circuit and a gated power output circuit connected through the said connecting circuit of a respectively associated selector means, said power switching means effecting the application of power to said gated power output circuit thereof in response to the reception of a control signal in its control signal input circuit; and control signal generating means responsive to the occurrence of the initiation of a count by said counter means and the subsequent occurrence of said predetermined counts thereof, applying control signals, respectively, to the control signal inputs of the respectively associated power switching means.

9. Means selectively switching operating power to a predetermined circuit node in response to the simultaneous occurrence of first and second input signals comprising a source of operating power; first amplifier means including a first common terminal and a first power input terminal connected on opposite sides of said source, a signal input terminal and a first power output terminal, said first amplifier means effecting an application of operating power to said first power output terminal upon the occurrence of an input signal at said input terminal; and second amplifier means including a second power input terminal connected with said first power output terminal, a second common terminal connected with said first common terminal, a second signal input terminal, a second power output terminal, the latter comprising said predetermined circuit node, said second amplifier means effecting a switching of operating power to said circuit node upon the simultaneous occurrence of a second input signal at said second input terminal and the presence of operating power at the said second power input terminal, whereby said switching is only effected upon the simultaneous occurrence of first and second input signals at said first and second input terminals, respectively; said first and second amplifier means comprise, respectively, first and second transistor means having first and second base, collector and emitter terminals, respectively, first and second bias circuit means respectively including said first and second base terminals connected across said power source normally biasing said first and second respective transistor means to conduct; first and second power circuit means, respectively, coupling said first and second power input terminals with said first and second collector terminals, said first collector terminals comprising said first power output terminal and said second collector terminal being interconnected with said predetermined circuit node; and first and second coupling means respectively connecting said first and second input terminals with said first and second base terminals; said first and second emitter terminals respectively comprising said first and second common terminals; and wherein, in response to coincident first and second input signals, respectively, at said first and second input terminals, said first and second transistor means are rendered non-conductive and operating power is applied to said predetermined circuit node.

10. The invention defined in claim 18, wherein said second amplifier means further includes unidirectional conducting means interconnecting said second collector terminal and said predetermined circuit node.

References Cited

UNITED STATES PATENTS

| | | | |
|---|---|---|---|
| 2,844,812 | 7/1958 | Auerback | 235—92 |
| 3,056,548 | 10/1962 | Nichols | 235—92 |
| 3,344,408 | 9/1967 | Singer | 235—92 |

MAYNARD R. WILBUR, *Primary Examiner.*

G. J. MAIER, *Assistant Examiner.*